(12) United States Patent
Yoon et al.

(10) Patent No.: US 8,539,037 B2
(45) Date of Patent: Sep. 17, 2013

(54) METHOD AND APPARATUS FOR SYNCHRONIZING FEED INFORMATION

(75) Inventors: Seok-Hyun Yoon, Seoul (KR); Won-ho Ryu, Seoul (KR); Sung-ho Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 741 days.

(21) Appl. No.: 11/852,685

(22) Filed: Sep. 10, 2007

(65) Prior Publication Data

US 2008/0228945 A1    Sep. 18, 2008

(30) Foreign Application Priority Data

Mar. 12, 2007  (KR) ......................... 10-2007-0024125

(51) Int. Cl.
    *G06F 15/16*        (2006.01)
(52) U.S. Cl.
    USPC .......................................... 709/217; 709/248

(58) Field of Classification Search
    USPC ............ 709/248, 217–219, 227–229; 725/62
    See application file for complete search history.

(56) References Cited

U.S. PATENT DOCUMENTS

| 6,915,172 B2 * | 7/2005 | Parent et al. .................... 700/31 |
| 2005/0070241 A1 | 3/2005 | Northcutt et al. |
| 2007/0294366 A1 * | 12/2007 | Ozzie et al. ................... 709/217 |

FOREIGN PATENT DOCUMENTS

| KR | 10-2004-0102614 A | 12/2004 |
| KR | 10-2006-0109647 A | 10/2006 |

* cited by examiner

*Primary Examiner* — Afshawn Towfighi
(74) *Attorney, Agent, or Firm* — Sughrue Mion, PLLC (57) ABSTRACT

A method and apparatus for synchronizing feed information are provided. A podcasting client includes a synchronization-processing unit which synchronizes first feed information acquired from a connected device with pre-stored second feed information, and a communication interface which transmits feed information of content that is podcast based on the synchronized feed information to the connected device.

21 Claims, 7 Drawing Sheets

METHOD AND APPARATUS FOR SYNCHRONIZING FEED INFORMATION

CROSS-REFERENCE TO RELATED APPLICATION

This application claims priority from Korean Patent Application No. 10-2007-0024125, filed on Mar. 12, 2007 in the Korean Intellectual Property Office, the disclosure of which is incorporated herein in its entirety by reference.

BACKGROUND OF THE INVENTION

1. Field of the Invention

Methods and apparatuses consistent with the present invention relate to performing synchronization between a podcasting client and a portable device, and, more particularly, synchronizing feed information and content stored in a podcasting client with a portable device, and performing synchronization based on feed change information of the podcasting client and feed change information of the portable device.

2. Description of the Related Art

With the generalization of the Internet, user-created content, which may be represented by a blog, is wide spread. "Blog" is a compound word of "web" and "log". Blogs are places where users can freely upload their diaries, columns, articles, and so forth, and easily make their own space without knowing how to create a home page. In addition, a user can form a far-reaching content community around multimedia content registered in a blog post, and can make personal-media communications with blog users.

Figure 1:
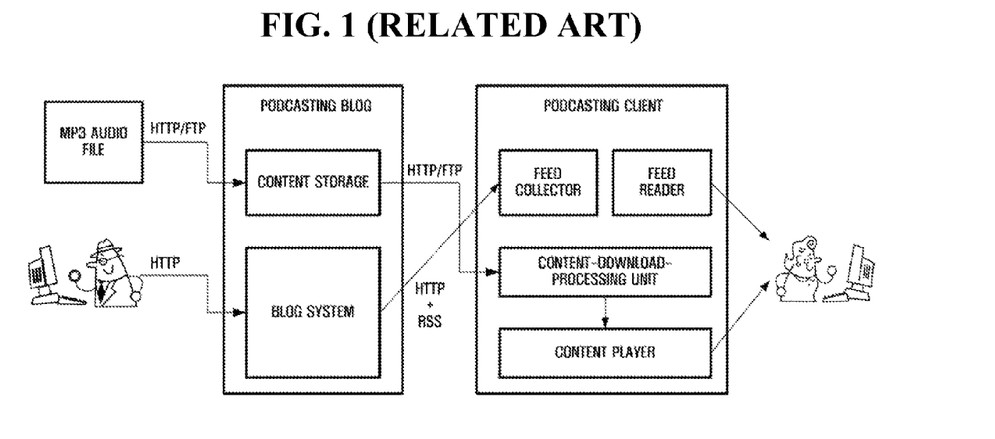
FIG. 1 is a view illustrating the construction of a related art podcast.

Existing blogs are text-oriented, but recently, preparation and sharing of content such as music, moving images, and so on, have been actively achieved through blogs. Such an action of distributing or sharing content through blogs is called a "podcasting" (which is a compound word of "iPOD" that is manufactured by Apple Inc. and "broadcasting"), and the construction of podcasting is shown in FIG. 1.

Podcasting involves uploading content prepared by a content provider to a web server using File Transfer Protocol (FTP) or Hypertext Transfer Protocol (HTTP), and preparing a post of the corresponding content. When the content is uploaded to the web server, a blog system of the web server generates an RSS document that includes Really Simple Syndication (RSS) feed information of the newly generated post.

A podcasting client (e.g., iPodder or iTunes) of a content receiver side collects the RSS document of the content newly registered in the web server. At this time, the podcasting client collects feed information using a work produced by the content receiver as a feedback.

Specifically, if a work such as registration of a new feed channel, deletion of the existing feed channel, reading of the collected feed, and so forth, is produced by the content receiver, the podcasting client collects the feed information by feeding back such information.

If the RSS document is collected as described above, the podcasting client extracts the content from the collected RSS document, and shows a user the extracted content. If a download of the content is requested, the podcasting client downloads the corresponding content to the PC of the content receiver. Then, the content receiver plays the downloaded content on the PC through a media player, or copies the downloaded content into a portable device.

The downloaded content may be copied into the portable device through a synchronization work between the podcasting client and the portable device. However, according to the related art synchronization method, since the content-oriented synchronization is performed, only the content stored in the PC is transmitted to the portable device, but the feed information is not transmitted to the portable device. In addition, since the related art synchronization method supports only a unidirectional policy, the podcasting client cannot use the work performed on the portable device as the feedback for the feed collection in the case where the registration or deletion of the feed channel is performed on the portable device.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

According to an aspect of the present invention, there is provided a synchronization method and apparatus capable of synchronizing feed information and content stored in a podcasting client with a portable device.

According to another aspect of the present invention, there is provided a method and apparatus capable of synchronizing feed information based on feed change information generated in a podcasting client and feed change information generated in a portable device.

Additional advantages, objects, and features of the invention will be set forth in part in the description which follows and in part will become apparent to those having ordinary skill in the art upon examination of the following or may be learned from practice of the invention.

According to an aspect of the present invention, there is provided a podcasting client that includes a synchronization-processing unit which synchronizes first feed information acquired from a connected device with second feed information, and a communication interface which transmits feed information of content that is podcast to the device based on the synchronized feed information.

According to another aspect of the present invention, there is provided a device, which includes a feed-change-log-management unit which generates a first feed change log in which a change of first feed information is recorded; and a communication interface which receives from a podcasting client an anchor that includes information on the result of the synchronization performed based on the first feed change log, and a second feed change log in which a change of second feed information of the connected podcasting client is recorded.

In still another aspect of the present invention, there is provided a method of synchronizing feed information, which includes synchronizing first feed information acquired from a connected device with second feed information; and transmitting feed information of content that is podcast to the connected device based on the synchronized feed information.

In still another aspect of the present invention, there is provided a method of synchronizing feed information, which includes generating a first feed change log in which a change of first feed information is recorded; and storing an anchor that includes resultant information of the synchronization performed based on the first feed change log, and a second feed change log in which a change of second feed information of a connected podcasting client is recorded.

BRIEF DESCRIPTION OF THE DRAWINGS

The above and other aspects of the present invention will be apparent from the following detailed description of exemplary embodiments taken in conjunction with the accompanying drawings, in which.

DETAILED DESCRIPTION OF THE EXEMPLARY EMBODIMENTS OF THE PRESENT INVENTION

Hereinafter, exemplary embodiments of the present invention will be described in detail with reference to the accompanying drawings. The aspects and features of the present invention and methods for achieving the aspects and features will be apparent by referring to the exemplary embodiments to be described in detail with reference to the accompanying drawings. However, the present invention is not limited to the exemplary embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures.

The present invention will be described herein with reference to the accompanying drawings illustrating block diagrams and flowcharts for explaining a method and apparatus for synchronizing feed information according to exemplary embodiments of the present invention. It should be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implements the function specified in the flowchart block or blocks.

The computer program instructions may also be loaded into a computer or other programmable data processing apparatus to cause a series of operational steps to be performed in the computer or other programmable apparatus to produce a computer implemented process such that the instructions that are executed on the computer or other programmable apparatus provide steps for implementing the functions specified in the flowchart block or blocks.

Also, each block of the flowchart illustrations may represent a module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in reverse order, depending upon the functionality involved.

Figure 2:
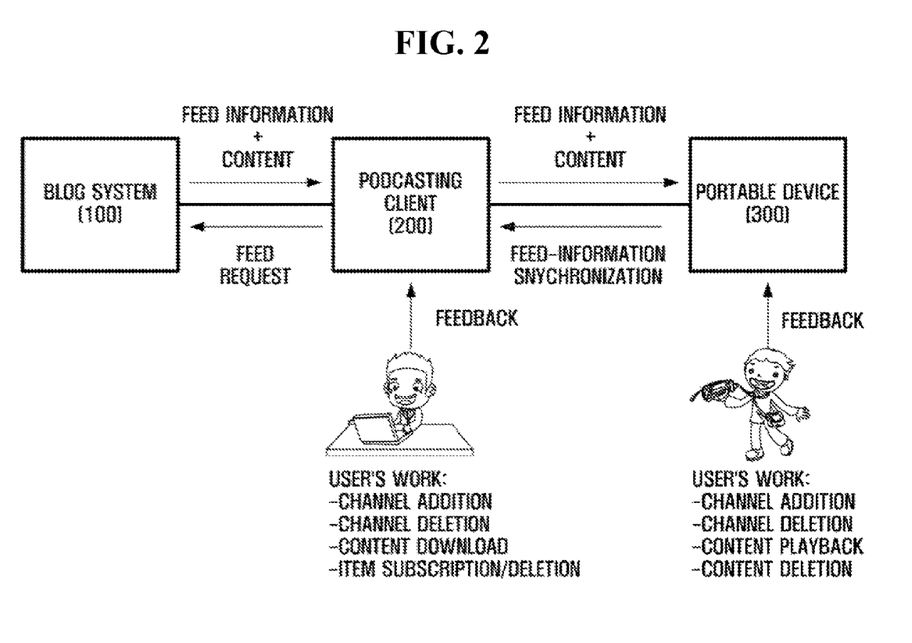
FIG. 2 is a view illustrating the construction of a podcast according to an exemplary embodiment of the present invention.

FIG. 2 is a view illustrating the construction of a system for supporting feed information synchronization according to an exemplary embodiment of the present invention.

A podcasting client 200 according to an exemplary embodiment of the present invention collects RSS feed information, downloads and stores multimedia content based on the collected RSS feed information. If a connection with a portable device 300 is detected, the podcasting client 200 synchronizes content and feed information with respect to the portable device 300. Details of the podcasting client 200 will be described later with reference to FIG. 3.

The portable device 300 supports synchronization of content and feed information with the podcasting client 200. Since the portable device 300 can freely move according to the characteristic of the device, it may connect with another podcasting client that is different from the podcasting client 200 used for the previous feed information synchronization. For example, the portable device 300 may connect with a home PC to synchronize feed information, and then connect with a PC in an office to synchronize feed information. The portable device 300 may be an MP3 player, a personal media player (PMP), a digital still camera (DSC), a personal digital assistant (PDA), a camera phone, and so forth, but is not limited thereto. Details of the portable device 300 will be described later with reference to FIG. 4.

Figure 3:
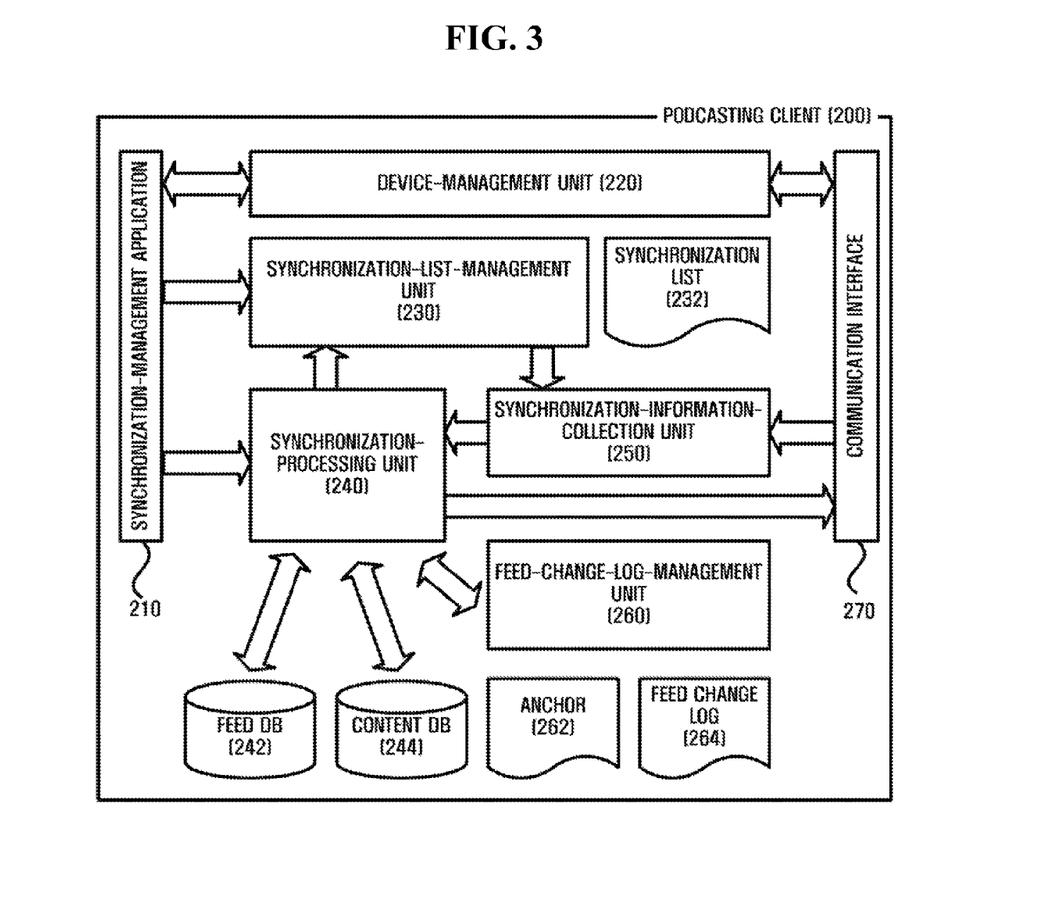
FIG. 3 is a view illustrating the construction of a podcasting client according to an exemplary embodiment of the present invention.

FIG. 3 is a view illustrating the construction of a podcasting client 200 according to an exemplary embodiment of the present invention.

As illustrated in FIG. 3, the podcasting client 200 includes a feed database (DB) 242, a content DB 244, a synchronization-management application 210, a device-management unit 220, a synchronization-list-management unit 230, a synchronization-processing unit 240, a synchronization-information-collection unit 250, a feed-change-log-management unit 260, and a communication interface 270.

The feed DB 242 is a database in which collected feed information is stored.

The content DB 244 is a database in which content downloaded through the podcasting is stored The synchronization-management application 210 is an application that interacts with a user for various settings related to the synchronization and others. The synchronization-management application 210 performs registration of the portable device 300 through the interaction with the device-management unit 220. In addition, the synchronization-management application 210 edits a synchronization list 232 through the synchronization-list-management unit 230, and performs the synchronization through the synchronization-processing unit 240.

The device-management unit 220 serves to detect whether the portable device 300 is connected thereto through an interface such as USB or IEEE 1394, and to confirm that the portable device 300 with which the connection is detected is a device registered as the object of synchronization. If the connected portable device 300 is a device that is the object of synchronization, but has not yet been registered, the device-management unit 220 inquires of the synchronization-management application 210 whether the corresponding device has been registered.

The synchronization-list-management unit 230 serves to manage the synchronization list 232 registered through the synchronization-management application 210. The synchronization list 232 corresponds to a list of channels that intend to synchronize with a specified portable device 300, i.e., a list of addresses that continuously provide feed.

The feed-change-log-management unit 260 serves to generate and manage a feed change log 264 in which a change generated in the content DB 244 and the feed DB 242 of the podcasting client 200 is recorded. For example, in the case where works, such as addition of a new channel, deletion of the existing channel, feed collection, feed deletion, feed reading, and so forth, are performed, the feed-change-log-management unit 260 generates the feed change log 264 in which the change is recorded. Details of the feed change log 264 will be described later with reference to FIG. 5.

The feed-change-log-management unit 260 manages an anchor 262, which is a file for judging the validity of the previous synchronization, and may include information on the feed change log finally processed during the previous synchronization. Details of the anchor 262 will be described later with reference to FIG. 5.

The synchronization-information-collection unit 250 may collect information required for the synchronization with the portable device 300. Specifically, the synchronization-information-collection unit 250 acquires the synchronization list 232 of the corresponding portable device 300 from the synchronization-list-management unit 230. Also, the synchronization-information-collection unit 250 acquires information required to perform the synchronization based on the change log, i.e., the feed change log 264 and the anchor 262, from the feed-change-log-management unit 260. Also, the synchronization-information-collection unit 250 acquires synchronization-related information of the portable device side, e.g., feed-change log (340 of FIG. 4) and anchor (330 of FIG. 4) stored in the portable device 300, through the interaction with the communication interface 270.

The synchronization-processing unit 240 synchronizes feed information and content between the podcasting client 200 and the portable device 300 based on the synchronization-related information, i.e., synchronization-related information of the podcasting client side and synchronization-related information of the portable device side, collected by the synchronization-information-collection unit 250. If a collision occurs during the synchronization, the synchronization-processing unit 240 performs the synchronization on the basis of either of the podcasting client 200 and the portable device 300. For example, if the feed information existing in both the podcasting client 200 and the portable device 300 include different data, a collision occurs during the synchronization process. In this case, the synchronization-processing unit 240 corrects data of the portable device side to match the podcasting client side, or corrects data of the podcasting client side to match the portable device side. Collision processing can be set in advance by a user.

Figure 4:
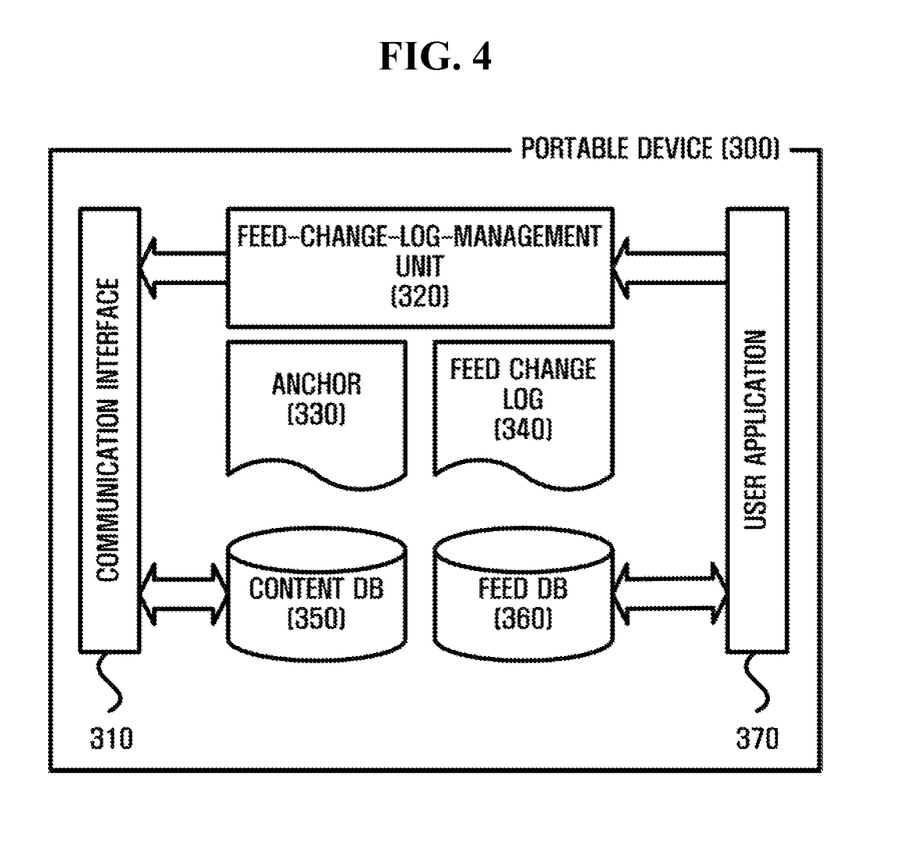
FIG. 4 is a view illustrating the construction of a portable device according to an exemplary embodiment of the present invention.

FIG. 4 is a view illustrating the construction of a portable device 300 according to an exemplary embodiment of the present invention.

As illustrated in FIG. 4, the portable device 300 includes a user application 370, a content DB 350, a feed DB 360, an anchor 330, a feed change log 340, a feed-change-log-management unit 320, and a communication interface 310.

The content DB 350 is a database in which content stored in the portable device 300 are gathered. The content may be downloaded from the podcasting client 200 or uploaded from the portable device 300 to the podcasting client 200 during the synchronization process.

The feed DB 360 is a database in which feed information of the content stored in the portable device 300 are gathered.

The anchor 330 is a file for judging the validity of the previous synchronization, and stores information on the feed change log finally processed during the previous synchronization.

The feed change log 340 is a file in which a change having occurred in the content DB 350 and the feed DB 360 stored in the portable device 30 is recorded.

The user application 370 is a user application mounted on the portable device 300. The change of the content DB 350 and the feed DB 360 stored in the portable device 300 is performed through the user application 370.

The feed-change-log-management unit 320 serves to store and manage the feed change log 340 in which the change of the content DB 350 and the feed DB 360 stored in the portable device are recorded. Specifically, in the case where the change, such as channel addition, channel deletion, feed addition, feed deletion, feed reading, and so forth, is generated with respect to the feed DB 360 stored in the portable device 300, the feed-change-log-management unit 320 records the change in the feed change log 340.

The communication interface 310 performs data exchange with the podcasting client 200. Specifically, the communication interface 310 transmits the feed change log 340 stored in the portable device 300 to the podcasting client, and receives the anchor generated as a result of synchronization with the podcasting client 200 from the podcasting client 200.

Next, the feed change log according to an exemplary embodiment of the present invention will be described with reference to FIG. 5.

Figure 5:
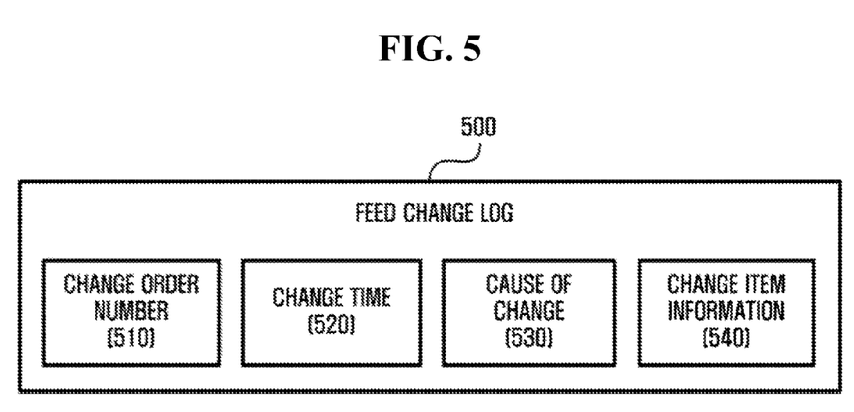
FIG. 5 is a view illustrating the construction of a feed change log according to an exemplary embodiment of the present invention.

FIG. 5 is a view illustrating the construction of the feed change log 500 according to an exemplary embodiment of the present invention.

As described above, the feed change log 500 is a file in which the change generated in the feed DB 360 after the previous synchronization is recorded. The feed change log 500 may be generated by the podcasting client 200 and the portable device 300, respectively. In the exemplary embodiment of the present invention, the podcasting client 200 performs the synchronization based on its own feed change log 264 and the feed change log 340 acquired from the portable device 300. In this case, since the synchronization can be performed only with respect to the changed feed information (or content) after the previous synchronization, without searching the whole feed information (or whole content), the synchronization speed can be improved.

The feed change log 500, as shown in FIG. 5, includes a change log sequence number 510, a change time 520, the cause of change 530, and changed item information 540.

The change log sequence number (CSN) 510 is the serial number of a change log, which may be set to increase only. If the CSN 510 is generated in this manner, a user can recognize the order of generation of the change log generated in the feed DB 242 of the podcasting client 200 or the change log generated in the feed DB 360 of the portable device 300 by confirming the CSN 510. In the exemplary embodiment of the present invention, the podcasting client 200 generates an anchor in which the CSN of the change log finally processed during the synchronization process is recorded, as a result of performing the synchronization, and stores the generated anchor in the podcasting client 200 and the portable device 300. If the CSN of the change log finally processed during the synchronization process is recorded in the anchor, the change log already processed during the previous synchronization can be discriminated from other change logs when the feed change log 264 of the podcasting client 200 and the feed change log 340 of the portable device 300 are referred to for the next synchronization.

The change time 520 is the time when the change log is generated. If the time when the change log was generated is recorded, it can be discriminated which feed change log, between the feed change log 264 of the podcasting client 200 and the feed change log 340 of the portable device 300, was generated first when the synchronization is performed based on the two feed-change log 264 and 340.

The cause of change 530 means the cause of the change log generation. The change log may be generated due to a user's work or as a result of synchronization. If the cause of change is recorded, the synchronization can be performed only with respect to the remaining change log except for the change log generated as a result of synchronization, i.e., the change log generated due to the user's work, during the next synchronization, and thus the synchronization efficiency can be improved.

The changed item information 540 means the contents of the change log having actually been generated, i.e., the type of the change log. For example, the change log may be "RegisterChannel", "UnregisterChannel", "AddItem", "RemoveItem", and "ReadItem".

"RegisterChannel" is a change log that is generated when a new channel is added. Specifically, in the podcasting client 200, "RegisterChannel" may be generated when a new channel is added to the synchronization list for the specified portable device 300. In the portable device 300, "RegisterChannel" may be generated when a new channel is added, or a channel is synchronized by the podcasting client 200.

"UnregisterChannel" is a change log that is generated when the existing channel is removed. Specifically, in the podcasting client 200, "UnregisterChannel" may be generated when the existing channel is removed from the synchronization list 232 for the specified portable device 300, or when a pre-registered channel is deleted. In the portable device 300, "UnregisterChannel" may be generated when the pre-registered channel is deleted.

"AddItem" is a change log that is generated when <entry> or <item> of a specified channel is added.

"RemoveItem" is a change log that is generated when <entry> or <item> of a specified channel is deleted.

"ReadItem" is a change log that is generated when a user reads <entry> or <item> of a specified channel, or related multimedia content is reproduced.

The above-described change logs are to explain the exemplary embodiments of the present invention, but the present invention is not limited thereto.

The anchor according to an exemplary embodiment of the present invention will be described in the following with reference to FIG. 6.

Figure 6:
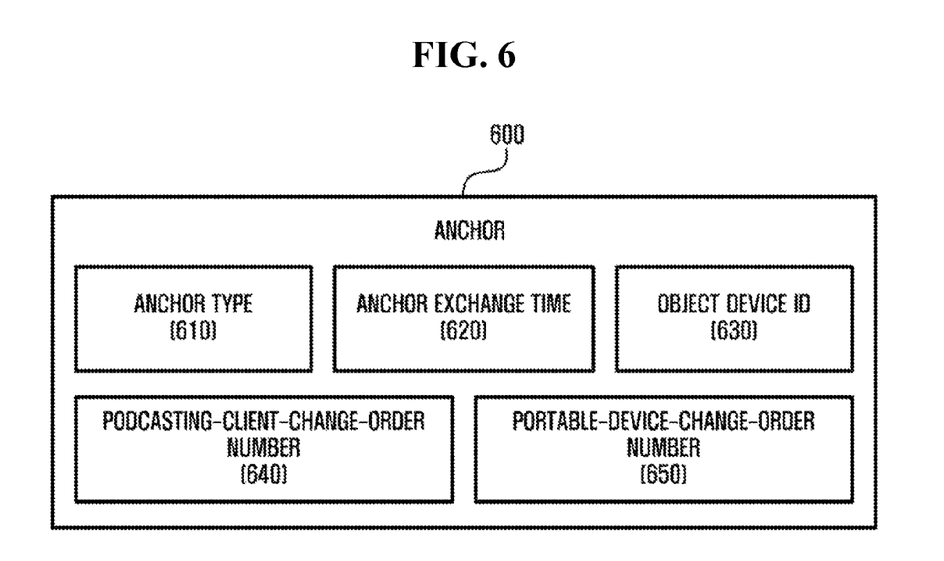
FIG. 6 is a view illustrating the construction of an anchor according to an exemplary embodiment of the present invention.

FIG. 6 is a view illustrating the construction of an anchor according to an exemplary embodiment of the present invention.

The anchor 600 is information for judging whether to perform the synchronization based on the feed change log, and may be generated as a result of performing the synchronization. The anchor 600 may be stored in both the podcasting client 200 and the portable device 300. The podcasting client 200 can perform the synchronization based on the feed change log when its own anchor 262 and the anchor 330 acquired from the portable device 300 coincide with each other as a result of comparing the two anchors 262 and 330.

It is preferable that in order to support the synchronization with a plurality of different portable devices, the podcasting client 200 keeps the anchor for all the portable devices that participate in the synchronization with the podcasting client.

The anchor 600, as illustrated in FIG. 6, includes an anchor type, an anchor exchange time 620, an object device ID 630, a podcasting client change order number 640, and a portable-device-change-order number 650.

The anchor type 610 is the type of anchor 600. The anchor type 610 is an element for the extension of the anchor 600, and it provides for the simultaneous support of diverse types of synchronization.

The anchor exchange time 620 indicates a time when the podcasting client 200 and the portable device 300 exchange the anchor after performing the synchronization. The anchor exchange time 620 may be recorded after the anchor 600 generated in the podcasting client 200 is stored in the podcasting client 200 and the portable device 300, respectively. Specifically, if the anchor is stored in both the podcasting client 200 and the portable device 300, the podcasting client 200 makes the anchor transfer the exchanged time to the portable device 300 to record the anchor exchange time.

The object device ID 630 is an identifier of the device that is the object of synchronization. Specifically, on the basis of the podcasting client 200, the object device ID 630 is the identifier of the portable device 300 that participates in the synchronization with the podcasting client 200. In the same manner, on the basis of the portable device 300, the object device ID 630 is the identifier of the podcasting client 200 that participates in the synchronization with the portable device 300.

The podcasting client change order number 640 corresponds to the change order number of the feed change log, the process of which is completed up to the anchor exchange time among the feed-change log of the podcasting client 200. Accordingly, if the podcasting client change order number 640 among information included in the anchor 600 is known, it can be confirmed which feed-change log the podcasting client 200 has processed among the feed-change log stored in the podcasting client 200.

The portable-device-change-order number 650 corresponds to the change order number of the feed change log, the process of which is completed up to the anchor exchange time among the feed-change log of the portable device 300. Accordingly, if the portable-device-change-order number 650 among information included in the anchor 600 is known, it can be confirmed which feed-change log the podcasting client 200 has processed among the feed-change log 340 of the portable device 300.

By recording the podcasting client change order number 640 and the portable-device-change-order number 650 in the anchor 600, the time when the synchronization is to be performed can be immediately confirmed from the change order number when the synchronization work is reopened after the synchronization work is stopped due to a power interception and so on.

Figure 7:
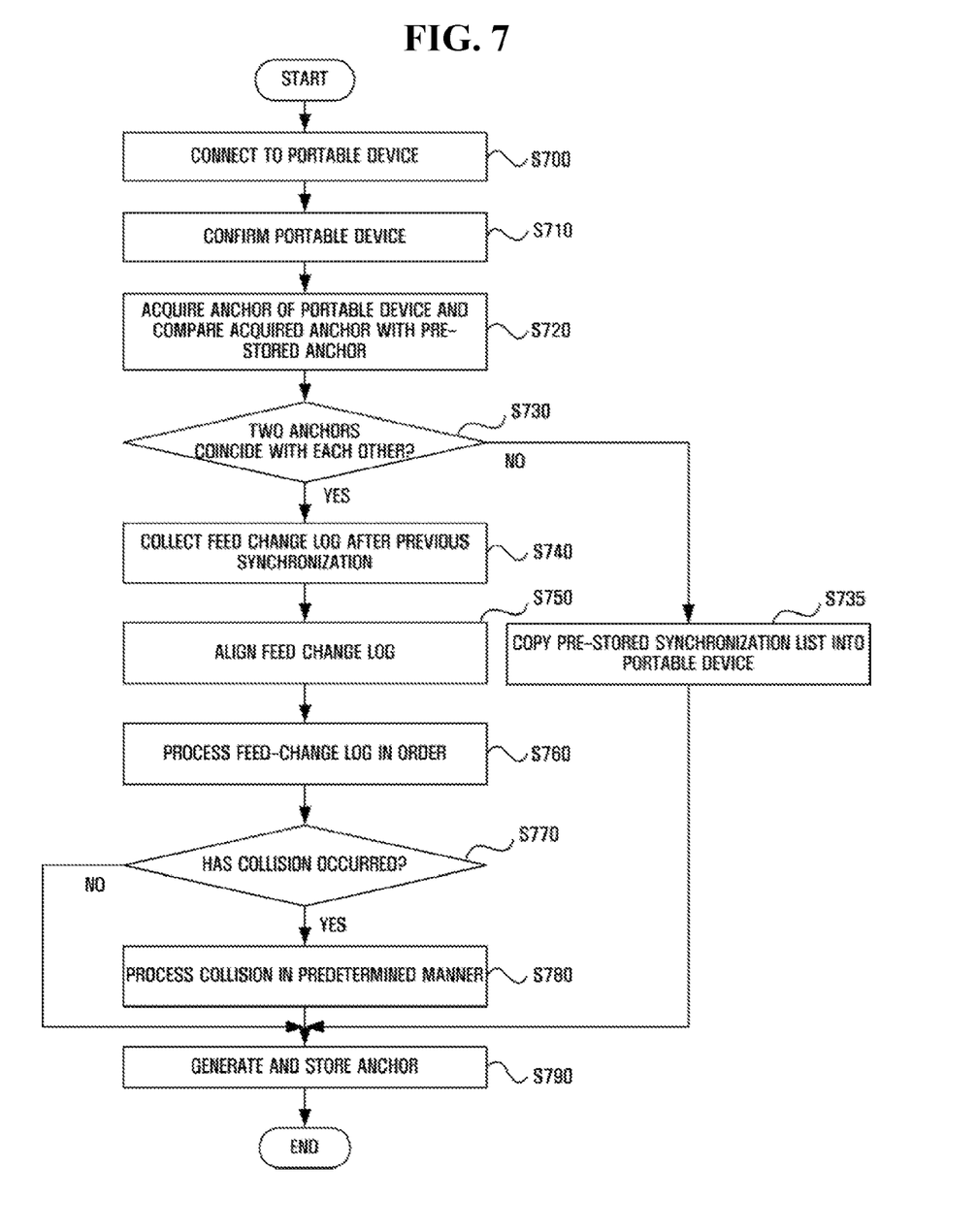
FIG. 7 is a flowchart illustrating a synchronization process of a podcasting client according to an exemplary embodiment of the present invention.

FIG. 7 is a flowchart illustrating the synchronization process of the podcasting client 200 according to an exemplary embodiment of the present invention.

First, the podcasting client 200 detects the connection with the device that is the object of synchronization, i.e., the portable device 300, (S700). In this case, the portable device 300 can be connected with the podcasting client 200 through a communication interface including Universal Serial Bus (USB), IEEE 1394, and others.

If the connection with the portable device 300 is detected, the podcasting client 200 recognizes and confirms the connected portable device 300 (S710). Specifically, the podcasting client 200 judges whether the connected portable device 300 is a device corresponding to the object of synchronization.

If the connected portable device 300 corresponds to the object of synchronization as a result of judgment, the podcasting client 200 determines what type of synchronization is to be performed with respect to the currently connected portable device 300. For this, the podcasting client 200 acquires the anchor 330 that includes the identifier of the podcasting client 200 from the corresponding portable device 300. Then, the podcasting client 200 compares the anchor 262 that includes the identifier of the corresponding portable device 300 among the pre-stored anchors with the anchor 330 acquired from the portable device 300 (S720).

If the two anchors 262 and 330 do not coincide with each other as a result of comparison ("NO" in S730), the podcasting client 200 considers that the currently connected portable device 300 has been first connected to the podcasting client 200, and performs a slow synchronization. Specifically, the podcasting client 200 acquires the pre-stored synchronization list 232, and then copies the feed information and content of all channels that are included in the synchronization list 232 into the portable device 300 (S735).

If the two anchors 262 and 330 coincide with each other as a result of comparison ("YES" in S730), the podcasting client 200 performs the synchronization based on the feed-change log. Here, the synchronization based on the feed-change log means the synchronization performed based on the feed change log 264 generated in the podcasting client 200 and the feed change log 340 generated in the portable device 300 after the previous synchronization.

In order to perform the synchronization based on the feed-change log, the podcasting client 200 first collects the feed-change log generated after the previous synchronization (S740). Specifically, the podcasting client 200 acquires from the pre-stored synchronization list the feed-change log 264 including the change logs generated for the synchronization list 232 of the currently connected portable device 300. Then, the podcasting client 200 acquires the feed change log (hereinafter referred to as a "first feed change log") having the change order number that is larger than the podcasting client change order number 640 recorded in the anchor 262 among the acquired feed-change log 264. Also, the podcasting client 200 acquires the feed change log (hereinafter referred to as a "second feed change log") having a change order number that is larger than the portable-device-change-order number 650 recorded in the anchor 262 among the feed-change log stored in the portable device 300.

If the first feed change log and the second feed change log are acquired, the podcasting client 200 aligns the first feed change log and the second feed change log on the basis of the time when the change logs are generated (S750). If the first and second feed-change logs are aligned, the podcasting client 200 performs the synchronization in order, starting from the old feed change log (S760). In this case, if a collision occurs ("YES" in S770), the podcasting client 200 processes the collision in a predetermined manner (S780).

If the synchronization is performed with respect to all aligned feed-change log, the podcasting client 200 generates an anchor including information on the results of synchronization, and stores the generated anchor in the podcasting client 200 and the portable device 300, respectively (S790).

The anchor may include the change order number of the feed change log finally processed among the first feed-change log and the change order number of the feed change log finally processed among the second feed-change log. In addition, the anchor may include an identifier of the podcasting client 200 and an identifier of the portable device 300 that participates in the synchronization.

If the storing of the anchor is completed, the podcasting client 200 deletes the feed-change log processed through the operations including (S790) among the feed-change log.

If the portable device 300 is connected to another podcasting device (hereinafter referred to as a "second portable device") after the completion of the synchronization process, the podcasting client connected to the second portable device synchronizes the feed information with the second portable device by performing the above-described operations S700 to S790. If the synchronization of one portable device 300 with different podcasting devices is performed as described above, the channel newly registered in a specified podcasting client 200 can be registered in another podcasting client 200 without any separate work. For example, if a user connects with the portable device 300 after adding a new channel to the podcasting client at home, information of the newly added channel is synchronized with the portable device 300. If the portable device 300 is connected with the podcasting client located in an office, the channel information of the portable device 300 can be synchronized with the podcasting client 200 in the office. Accordingly, a user can register the channel, which has been registered in the home podcasting client 200, in the office podcasting client 200.

As described above, the method and apparatus for synchronizing feed information according to the exemplary embodiments of the present invention produces the following effects.

By synchronizing a channel deleted from or added to the portable device and feed information of the multimedia content with the podcasting client, the user work generated in the portable device can be used as a feedback in collecting the feed.

A channel newly registered in a specified podcasting client can be registered in another podcasting client through the feed information synchronization with the portable device.

Since the synchronization is performed on the basis of the feed-change log, time required for the synchronization can be reduced.

Although a method and apparatus for synchronizing feed information according to exemplary embodiments of the present invention have been described with reference to the accompanying drawings, those skilled in the art will appreciate that many variations and modifications can be made to the disclosed exemplary embodiments without substantially departing from the principles of the present invention. Therefore, the disclosed exemplary embodiments of the invention are used in a generic and descriptive sense only and not for purposes of limitation. Therefore, the scope of the present invention is not limited to the exemplary embodiments, but is defined by the appended claims or equivalents.

What is claimed is:

1. A podcasting client comprising:
a synchronization-processing unit which synchronizes first feed information acquired from a connected device with second feed information; and
a communication interface which transmits feed information of content that is podcast based on the synchronized first feed information to the connected device,
wherein the synchronization-processing unit performs synchronization based on the first feed information and the second feed information if a first anchor including resultant information of synchronization of the connected device coincides with a second anchor including resultant information of synchronization of the podcasting client, wherein the synchronization-processing unit copies the second feed information into the connected device if the first anchor including resultant information of synchronization of the connected device does not coincide with the second anchor including resultant information of synchronization of the podcasting client, wherein the first anchor and the second anchor include at least one of a first change order number of a first feed change log processed during a previous synchronization with the connected device among first feed change logs included in the first feed information and a second change order number of a second feed change log processed during the previous synchronization with the connected device among second feed change logs included in the second feed information, wherein the first and the second feed change logs record changes generated in a feed database in which the feed information is stored, and wherein the change order number is a number associated with each of the feed change logs.

2. The podcasting client of claim 1, wherein each of the first feed information and the second feed information comprise at least one of a time when a change of the feed information is generated, a cause of a change of the feed information, a changed item and the first or the second change order number, respectively, that indicates an order of change.

3. The podcasting client of claim 2, wherein the changed item comprises at least one of channel addition, channel deletion, feed collection, feed deletion, and feed reading.

4. The podcasting client of claim 1, wherein the first anchor includes an identifier of the podcasting client.

5. The podcasting client of claim 1, wherein the second anchor includes an identifier of the connected device.

6. The podcasting client of claim 1, wherein the synchronization-processing unit aligns the first feed information and the second feed information based on a time when a change is generated, and performs synchronization work in an order with respect to the aligned feed information.

7. The podcasting client of claim 1, wherein the synchronization-processing unit generates an anchor that includes resultant information of synchronization of the first feed information and the second feed information, and stores the generated anchor in the connected device.

8. The podcasting client according to claim 1, wherein the synchronization processing unit acquires a third feed change log among the first feed change logs having a change order number larger than the first change order number, and acquires a fourth feed change log among the second feed change logs having a change order number larger than the second change order number.

9. The podcasting client according to claim 1, wherein the synchronization processing unit aligns a third feed change log and a fourth feed change log on a basis of a generation time of a third and a fourth feed change logs.

10. The podcasting client according to claim 9, wherein after the third and the fourth feed change logs are aligned, the synchronization processing unit performs the synchronization in order, starting from oldest feed change log.

11. A device comprising:
a feed-change-log-management unit which generates a first feed change log in which a change of first feed information is recorded; and
a communication interface which receives from a podcasting client an anchor that includes resultant information of synchronization performed based on the first feed change log and a second feed change log in which a change of second feed information of the connected podcasting client is recorded, wherein the anchor includes at least one of a first change order number of a first feed change log processed during a previous synchronization among first feed change logs included in the first feed information and a second change order number of a second feed change log processed during the previous synchronization among second feed change logs included in the second feed information, wherein the first and the second feed change logs record changes generated in a feed database in which the feed information is stored, and wherein the change order number is a number associated with each of the feed change logs.

12. The device of claim 11, wherein the anchor is identical to an anchor stored in the podcasting client.

13. A method of synchronizing feed information, the method comprising:
synchronizing, with second feed information, first feed information acquired from a connected device; and
transmitting, to the connected device, feed information of content that is podcast based on the synchronized first feed information, wherein the synchronizing comprises performing synchronization based on the first feed information and the second feed information if a first anchor including resultant information of synchronization of the connected device side coincides with a second anchor, and wherein the synchronizing comprises copying the second feed information to the connected device if the first anchor including resultant information of synchronization of the connected device does not coincide with the second anchor, wherein the first anchor and the second anchor include at least one of a first change order number of a first feed change log processed during a previous synchronization with the connected device among first feed change logs included in the first feed information and a second change order number of a second feed change log processed during the previous synchronization with the connected device among second feed change logs included in the second feed information, wherein the first and the second feed change logs record changes generated in a feed database in which the feed information is stored, and wherein the change order number is a number associated with each of the feed change logs.

14. The method of claim 13, wherein each of the first feed information and the second feed information comprise at least one of a time when a change of the feed information is generated, a cause of change, a changed item and the first or the second change order number, respectively, that indicates an order of change.

15. The method of claim 14, wherein the changed item comprises at least one of channel addition, channel deletion, feed collection, feed deletion, and feed reading.

16. The method of claim 13, wherein the first anchor includes an identifier of a podcasting client that participates in a previous synchronization with the connected device.

17. The method of claim 13, wherein the second anchor includes an identifier of the connected device.

18. The method of claim 13, wherein the synchronizing comprises:
aligning the first feed information and the second feed information based on a time when a change is generated; and
performing a synchronization work in an order with respect to the aligned feed information.

19. The method of claim 13, wherein the synchronizing comprises:
generating an anchor that includes resultant information of synchronization of the first feed information and the second feed information; and
storing the generated anchor in the connected device.

20. A method of synchronizing feed information, the method comprising:
generating a first feed change log in which a change of first feed information is recorded; and
storing an anchor that includes resultant information of synchronization performed based on the first feed change log and a second feed change log in which a change of second feed information of a connected podcasting client is recorded,
wherein the anchor includes at least one of a first change order number of a first feed change log processed during a previous synchronization among first feed change logs included in the first feed information and a second change order number of a second feed change log processed during the previous synchronization among second feed change logs included in the second feed information,
wherein the first and the second feed change logs record changes generated in a feed database in which the feed information is stored, and
wherein the change order number is a number associated with each of the feed change logs.

21. The method of claim 20, wherein the anchor is identical to an anchor stored in the podcasting client.

* * * * *